(12) United States Patent
Kim et al.

(10) Patent No.: US 8,302,828 B2
(45) Date of Patent: Nov. 6, 2012

(54) CROSS BAR OF ROOF CARRIER FOR VEHICLES

(75) Inventors: Hang Young Kim, Gwangmyeong-si (KR); Woo Jin Lee, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 394 days.

(21) Appl. No.: 12/510,864

(22) Filed: Jul. 28, 2009

(65) Prior Publication Data
US 2010/0096422 A1 Apr. 22, 2010

(30) Foreign Application Priority Data
Oct. 22, 2008 (KR) .................. 10-2008-0103619

(51) Int. Cl.
*B60R 9/04* (2006.01)
*B60R 9/042* (2006.01)
*B60R 9/00* (2006.01)
*B60R 9/052* (2006.01)
*B60R 9/058* (2006.01)

(52) U.S. Cl. ........ 224/321; 224/309; 224/310; 224/315; 224/322; 224/325; 224/326; 224/329; 224/331

(58) Field of Classification Search .................. 224/321, 224/309, 310, 315, 322, 325, 326, 329, 331; 410/104, 105
See application file for complete search history.

(56) References Cited

U.S. PATENT DOCUMENTS

| | | | |
|---|---|---|---|
| 5,924,614 A * | 7/1999 | Kuntze et al. ................ | 224/321 |
| 6,050,467 A * | 4/2000 | Drouillard et al. ............ | 224/321 |
| 6,112,964 A * | 9/2000 | Cucheran et al. ............. | 224/321 |
| 6,131,782 A * | 10/2000 | De Silva et al. .............. | 224/321 |
| 6,779,696 B2 * | 8/2004 | Aftanas et al. ................ | 224/315 |
| 7,044,345 B2 * | 5/2006 | Aftanas ......................... | 224/321 |
| 7,198,184 B2 * | 4/2007 | Aftanas et al. ................ | 224/309 |
| 7,441,679 B1 * | 10/2008 | Harberts et al. .............. | 224/321 |
| 7,802,707 B2 * | 9/2010 | Aftanas ......................... | 224/321 |
| 7,806,306 B2 * | 10/2010 | Aftanas ......................... | 224/321 |
| 7,926,685 B2 * | 4/2011 | Aftanas ......................... | 224/321 |
| 2007/0125817 A1 * | 6/2007 | Aftanas ......................... | 224/325 |
| 2008/0128461 A1 * | 6/2008 | Lee ............................... | 224/321 |

FOREIGN PATENT DOCUMENTS
KR 10-0609489 B1 8/2006

* cited by examiner

*Primary Examiner* — Nathan J Newhouse
*Assistant Examiner* — Lester L Vanterpool
(74) *Attorney, Agent, or Firm* — Morgan, Lewis & Bockius LLP

(57) ABSTRACT

Disclosed herein is a cross bar of a roof carrier for vehicles. The cross bar may include a cross bar body. First and second brackets are provided on both ends of the cross bar body. First and second locking pins are provided, respectively, on the first and second brackets to be elastically ejected. A link is positioned in the first bracket and hinged to the first locking pin. A release lever includes a coupling part hinged to the link and installed via a rotating shaft, and a grip part exposed to the outside, so that when the release lever rotates, the link and the first locking pin are pulled into the cross bar body. A wire couples the coupling part of the release lever with the second locking pin. According to the present invention, the release lever is mounted to only one side and only one wire is used, thus reducing manufacturing costs.

9 Claims, 7 Drawing Sheets

CROSS BAR OF ROOF CARRIER FOR VEHICLES

CROSS-REFERENCE TO RELATED APPLICATIONS

The present application claims priority to Korean Patent Application Number 10-2008-0103619 filed Oct. 22, 2008, the entire contents of which application is incorporated herein for all purpose by this reference.

BACKGROUND OF THE INVENTION

1. Field of the Invention

The present invention relates to a cross bar of a vehicle rooftop carrier.

2. Description of Related Art

Recently, recreational vehicles and vans have been widely used in the performance of leisure activities. Because of the limited internal space in the vehicles, a variety of cargo or leisure equipment is loaded on the roof thereof To this end, a roof carrier is mounted on the roof of a vehicle.

The roof carrier for vehicles includes side bars which are provided on both sides of the roof in the longitudinal direction of a vehicle, and cross bars which are transversely mounted between the side bars. The cross bars are secured to the side bars so as to hold cargo at a predetermined position. When it is required to change the position of each cross bar, it is necessary to release the cross bar from the side bars. Thus, the roof carrier is constructed so that a passenger adjusts the position of the cross bar to be appropriate to the size or length of the cargo, and secures the cross bar at the adjusted position between the side bars.

Referring to FIG. 1, a conventional roof carrier for vehicles is constructed as follows. Specifically, side bars 90 are mounted to both sides of the roof of the vehicle in such a way as to extend in the longitudinal direction of the vehicle, and cross bars 10 are installed between the side bars 90. Brackets 30 are coupled to opposite ends of each cross bar 10, and locking pins 70 protrude out from the corresponding brackets 30. A plurality of pin insert holes 92 is formed in the inner surfaces of the side bars 90 at regular intervals such that the locking pins 70 are inserted into the pin insert holes 92. The locking pins 70 of the cross bar 10 are ejected or retracted to be locked to or released from associated pin insert holes 92. Thus, after the locking pins 70 are retracted into the brackets 30, the position of the cross bar 10 is adjusted. Thereafter, the locking pins 70 are ejected, thus securing the cross bar 10 at the adjusted position. Of course, the cross bar 10 slides along rails which are provided on the inner surfaces of the side bars 90.

However, the conventional cross bar of the roof carrier for vehicles is problematic in that a plurality of wires, a spring, and levers are used, so that the construction of the cross bar is complicated, and the manufacturing cost is high. Further, after the wires have been used for a lengthy period of time, the durability of a product is reduced due to the deterioration of the wires.

Further, the conventional cross bar of the roof carrier for vehicles is problematic in that the locking pins may be undesirably removed from the corresponding side bars although the levers have not been operated. Thus, when a vehicle runs on a rough road surface, the locking pins may be removed from the side bars due to the vibration of the vehicle, so that cargo may fall from the roof.

It is to be understood that the foregoing description merely aids in understanding the present invention, and does not mean that the present invention falls under the purview of the related art which was already known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a cross bar of a roof carrier for vehicles, which uses one wire and has a lever on only one side, thus reducing the number of parts, and which uses a two-stage locking method, thus preventing the undesirable retraction of a locking pin.

In an aspect of the present invention, the cross bar of a roof carrier for vehicles, may include a cross bar body placed transversely between side bars provided on both longitudinal sides of a roof, first and second brackets provided, respectively, on both distal ends of the cross bar body and slidably coupled to the side bars, first and second locking pins provided, respectively, on the first and second brackets, and elastically inserted into the corresponding side bars, a link positioned in the first bracket and hinged at a first end thereof to a first end of the first locking pin, a release lever including a coupling part, wherein one end of the coupling part is hinged to a second end of the link and coupled to the cross bar body via a rotating shaft, and a grip part extending from the coupling part to be exposed to an outside, so that when the release lever rotates around the rotating shaft, the link and the first locking pin are pulled into the cross bar body, and a wire passing through the cross bar body, and coupling the coupling part of the release lever with the second locking pin, so that the wire pulls the second locking pin into the cross bar body during rotation of the release lever to pull the first locking pin into the cross bar body.

The first end of the first locking pin may be aligned to be lower than the rotating shaft of the coupling part.

The coupling part of the release lever may have on a center portion thereof the rotating shaft, and is coupled at a rear end thereof to the wire, and the grip part is integrated with the coupling part in such a way as to extend rearwards from an upper end of the coupling part, wherein the grip part is offset from the rotating shaft in a predetermined distance, wherein a movement axis of the first locking pin is aligned to be lower than the rotating shaft of the release lever, and wherein the rear end of the coupling part coupled to the wire protrudes rearwards, so that when the coupling part rotates around the rotating shaft, a wire pulling amount is increased.

In another aspect of the present invention, a locking pin support part may be provided on each of the first and second brackets, and a portion of an associated locking pin passes through the locking pin support part, and a locking protrusion is provided on a passing part of the locking pin, and an elastic member is interposed between the locking protrusion and the locking pin support part, so that the locking pin is elastically ejected into the corresponding side bar, wherein a lever locking part is provided on the cross bar body and the coupling part of the release lever is pivotally coupled to the lever locking part and the locking pin support part is provided on a central portion of the first bracket.

The coupling part of the release lever may be installed to an inner surface of the lever locking part via the rotating shaft, and the link is hinged to an inner surface of the coupling part of the release lever, and the first locking pin is hinged to an inner surface of the first end of the link, thus preventing lateral movement.

A stopper may protrude from a part of each of the first and second locking pins connected to the link or wire, thus preventing each of the first and second locking pins from being removed from the locking pin support part.

In further another aspect of the present invention, when the grip part of the release lever is pressed down and located at a lowermost end, a portion of the link coupled to the coupling part moves upwards and forms a predetermined angle with the first locking pin, thus preventing undesirable movement of the first locking pin.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1A:
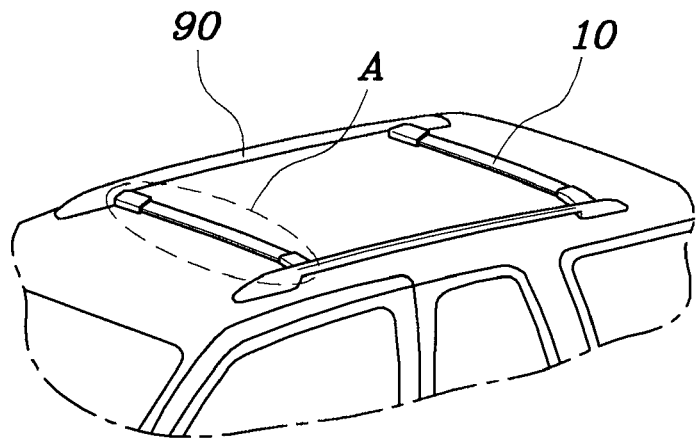
FIG. 1A is a drawing illustrating a conventional cross bar on a roof carrier of a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a cross bar of a roof carrier for vehicles according to an exemplary embodiment of the present invention will be described with reference to the accompanying drawings. Further, the terms 'clockwise' or 'counterclockwise' used herein merely mean relative directions, and the present invention is not limited to the disclosed directions.

Figure 2:
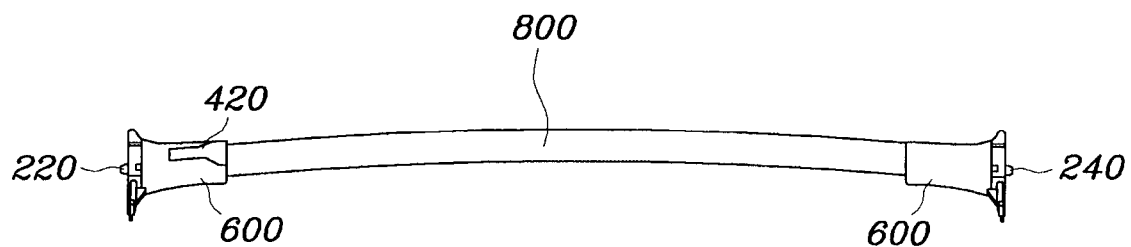
FIG. 2 is a schematic drawing showing an exemplary cross bar of a roof carrier for vehicles according to the present invention.

Referring to FIG. 2, a cross bar of a roof carrier for vehicles according to an exemplary embodiment of the present invention includes cross bar body 800, a first locking pin 220 provided with a first end of the cross bar body 800, and a second locking pin 240 provided with a second end of the cross bar body 800.

Figure 7:
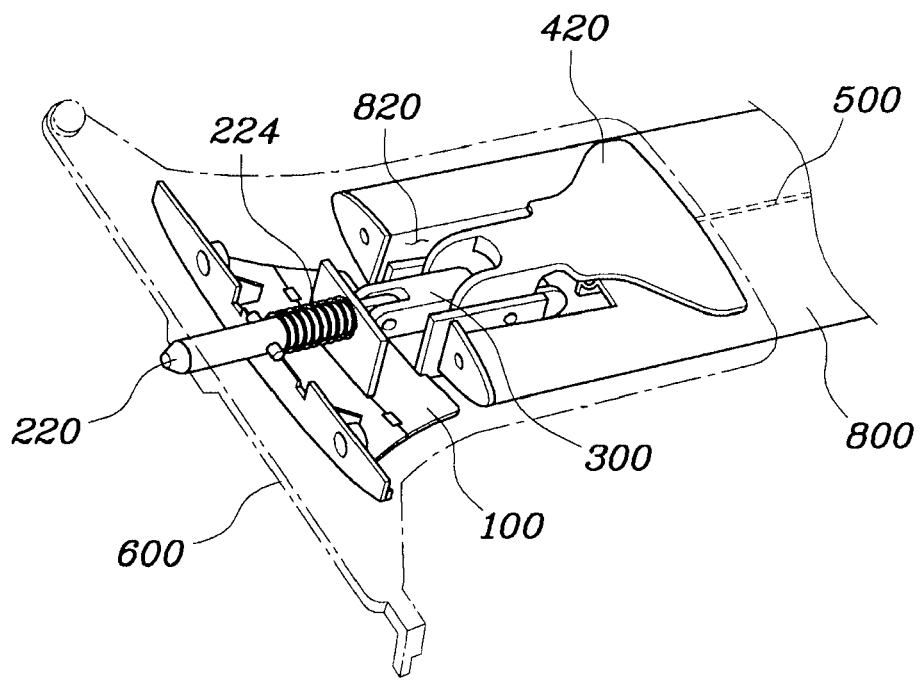
FIG. 7 is another schematic drawing illustrating a structure of the first release lever side of the cross bar of FIG. 2, in which the outer bracket is shown with dotted line.
Figure 8:
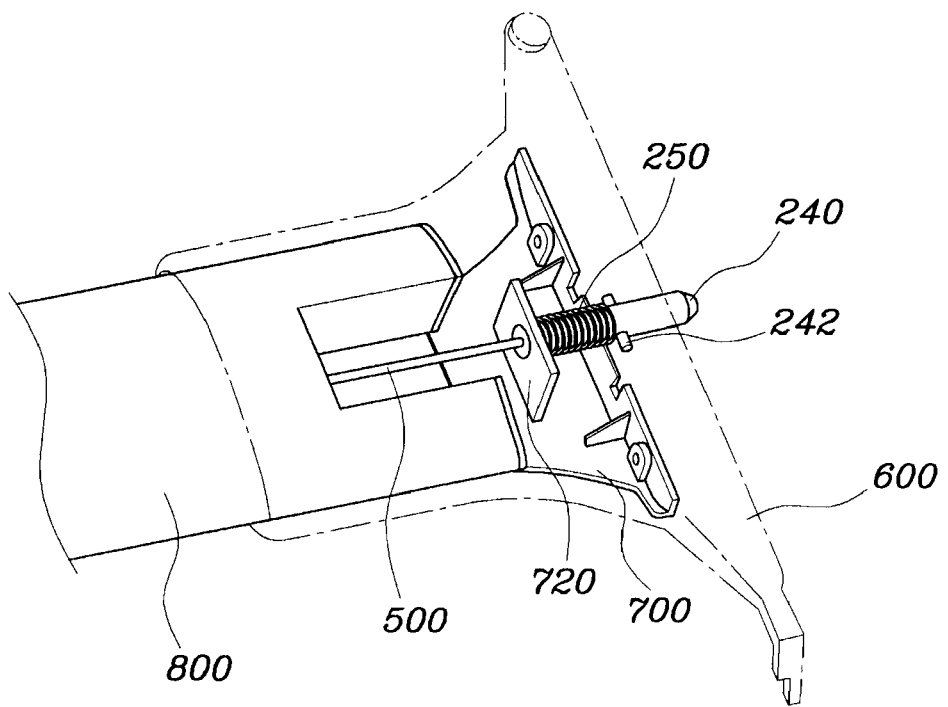
FIG. 8 is a schematic drawing illustrating a structure of the second locking pin side of the cross bar of FIG. 2, in which an outer bracket is shown with dotted line.

Referring to FIGS. 7 and 8, first and second brackets 100 and 700 are installed at both ends of the cross bar body 800, and the first and second locking pins 220 and 240 are retractably installed at the first and second brackets 100 and 700. The ends of the first and second locking pins 220 and 240 are elastically protruded by springs 224 and 250 outside of the outer brackets 600 covering the first and second brackets 100 and 700.

Figure 3:
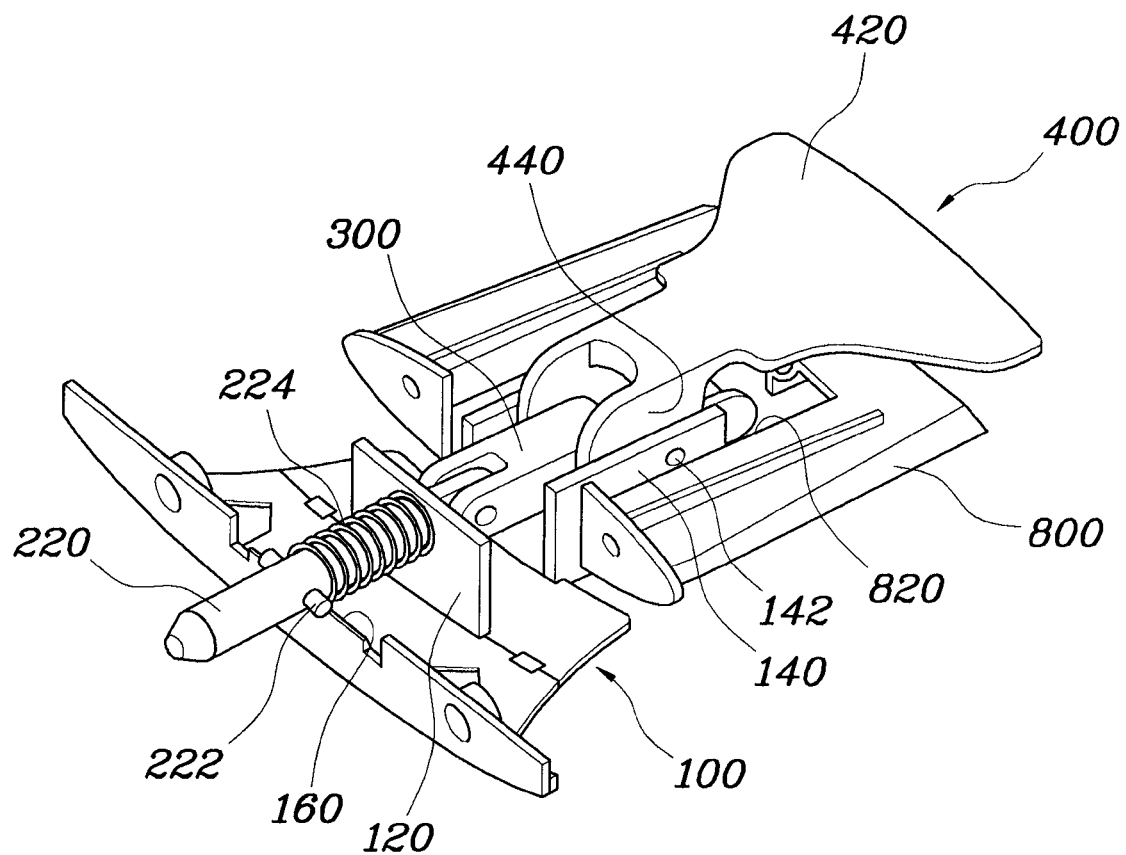
FIG. 3 is a schematic drawing illustrating a structure of the first locking pin side of the cross bar of FIG. 2, in which an outer bracket is omitted.

Referring to FIGS. 2 and 3, the cross bar of the roof carrier for vehicles includes a release lever 400 exposed on the outer bracket 600 at the first end of the cross bar body 800. The release lever is pivotably engaged with a link 300 which is pivotably engaged with the first locking pin 220.

When the grip part 420 of the release lever 400 is pulled, the release lever 400 is rotated counterclockwise. As the release lever 400 rotates, the second locking pin 240 is retracted by a wire 500 (refer to FIGS. 7 and 8) and also the first locking pin 220 is retracted by the counterclockwise movement of the link 300. That is to say, by pulling the release lever 400, both the first and second locking pins 220 and 250 can be retracted.

Figure 4:
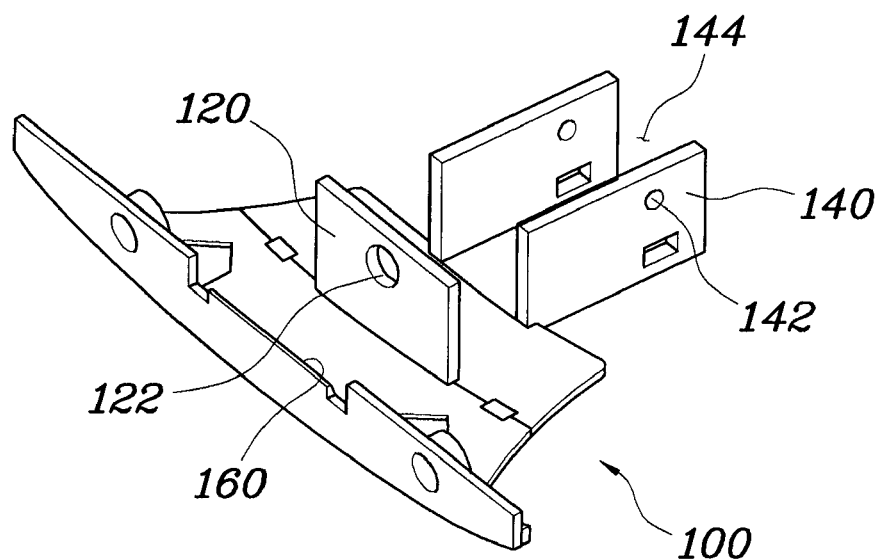
FIG. 4 is a schematic drawing showing the first bracket of the cross bar in FIG. 3.
Figure 5:
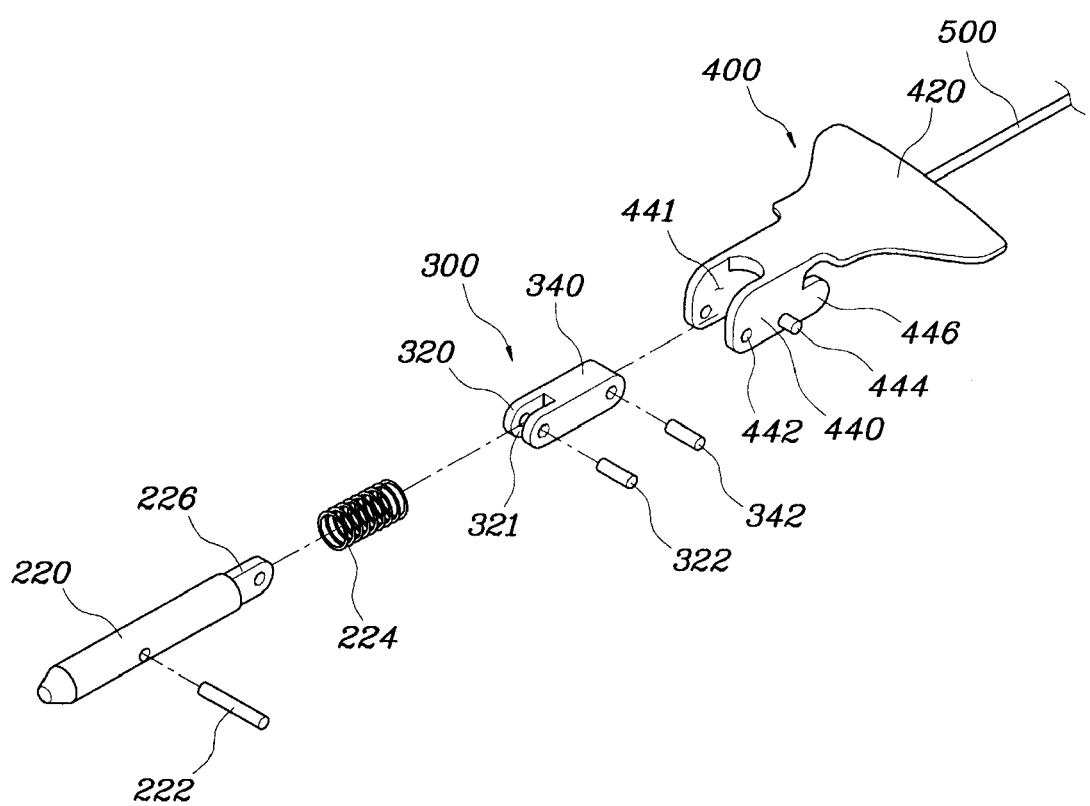
FIG. 5 is a schematic drawing illustrating the first locking pin, the link and the release lever shown in FIG. 3.

Referring to FIGS. 3 to 5, the release lever 400, the link 300 and the first locking pin 220 are mounted to the first bracket 100. The release lever 400 includes the grip part 420 and a coupling part 440 having a rotating shaft 444. A lever locking part 140 is provided on the innermost end of the first bracket 100 to support the coupling part 440 of the release lever 400. The lever locking part 140 defines a predetermined space 144 and has on both sides thereof panels which extend upwards.

The rotating shaft 444 is inserted into shaft insert holes 142 formed on both panels such that the release lever 400 is rotatable about the rotating shaft 444 with respect to the lever locking part 140. A locking pin support part 120 having a shape of a panel extending upwards is provided on the central portion of the first bracket 100 to support the first locking pin 220. A through hole 122 is formed in the locking pin support part 120 and the first locking pin 220 is retractably installed through the through hole 122. Another hole 160 is formed in the outermost end of the first bracket 100 so that the first locking pin 220 passes through the hole 160.

Figure 6A:
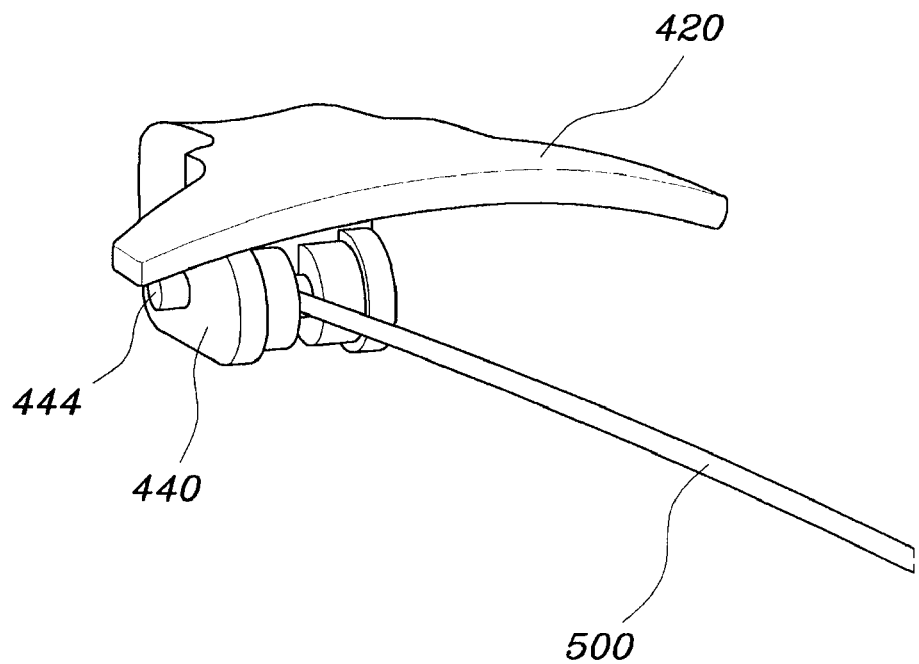
FIG. 6A is a rear view of the release lever shown in FIG. 5.
Figure 6B:
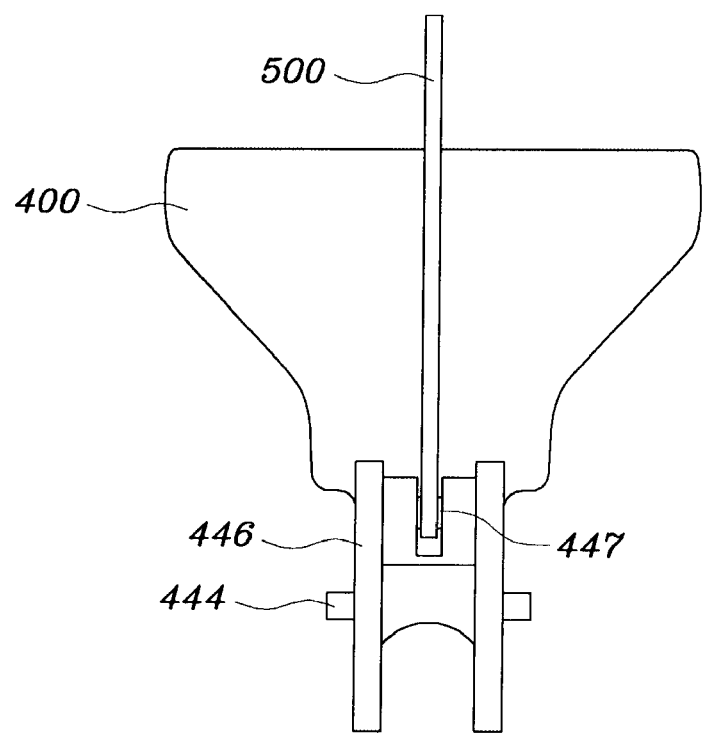
FIG. 6B is a bottom view of the release lever shown in FIG. 5.

Referring to FIGS. 5 to 6B, a space 441 is formed in the front end portion of the coupling part 440. A rear end portion 340 of the link 300 is received in the space 441 and coupled to the coupling part 440 by a pin 342. The rotating shaft 444 is positioned at the center of the coupling part 440. The wire 500 is coupled to a connection point 447 provided in a rear end portion 446, protruded rearward, of the coupling part 440. Thus, when the coupling part 440 rotates counterclockwise about the rotating shaft 444, the wire 500 is pulled toward the first locking pin 220 (refer to FIGS. 10B and 10C) and the second locking pin 240 connected to the wire 500 (refer to FIG. 8) is retracted toward the first locking pin 220.

A rear end portion 226 of the first locking pin 220 is coupled to a frond end portion 320 having an opening 321 of the link 300 via a pin 322. The grip part 420 is integrated with the coupling part 440 in such a way as to extend rearwards from the upper end of the coupling part 440. Thus, when the grip part 420 is pulled, the link 300 hinged at the rear end portion thereof to the coupling part 440 rotates clockwise, and the first locking pin 220 hinged at a rear end portion 226 to the front end portion 320 of the link 300 is retracted toward the second locking pin 240 (refer to FIGS. 10B and 10C).

Referring FIG. 3, a locking protrusion 222 is provided on the first locking pins 220 and the spring 224 is wound up on the first locking pin 220. A first end of the spring 224 is stopped by the locking protrusion 222 and second end of the spring 224 is stopped by the locking pin support part 120. Thus, when a force pushing rearward on the front end of the first locking pin 220 is removed, the retracted first locking pin 222 is returned to its initial position.

Referring to FIG. 8, the second locking pin 240 also has a locking protrusion 242 to stop a first end of the spring 250 wounded up on the second locking pin 240. A second end of the spring 250 is stopped by the locking pin support part 720 supporting a rear portion of the second locking pin 240. When the wire 500 is pulled, the second locking pin 240 is retracted rearward. The spring 250 acts as a factor increasing a returning force to its initial position of the second locking pin 240 when a force pulling the wire 500 is removed. According to another embodiment of the present invention, the spring 250 on the second locking pin may be omitted.

Referring to FIGS. 7 and 8, the first bracket 100 and the second bracket 700 are coupled to both ends of the cross bar body 800, respectively, and the outer portion of each of the first and second brackets 100 and 700 is enclosed by the outer brackets 600. Of course, the outer bracket 600 may be formed integrally with or separately from each of the first and second brackets 100 and 700. A rectangular opening 820 is formed in one end of the cross bar body 800 to receive therein the coupling part 440 of the release lever 400.

Figure 9:
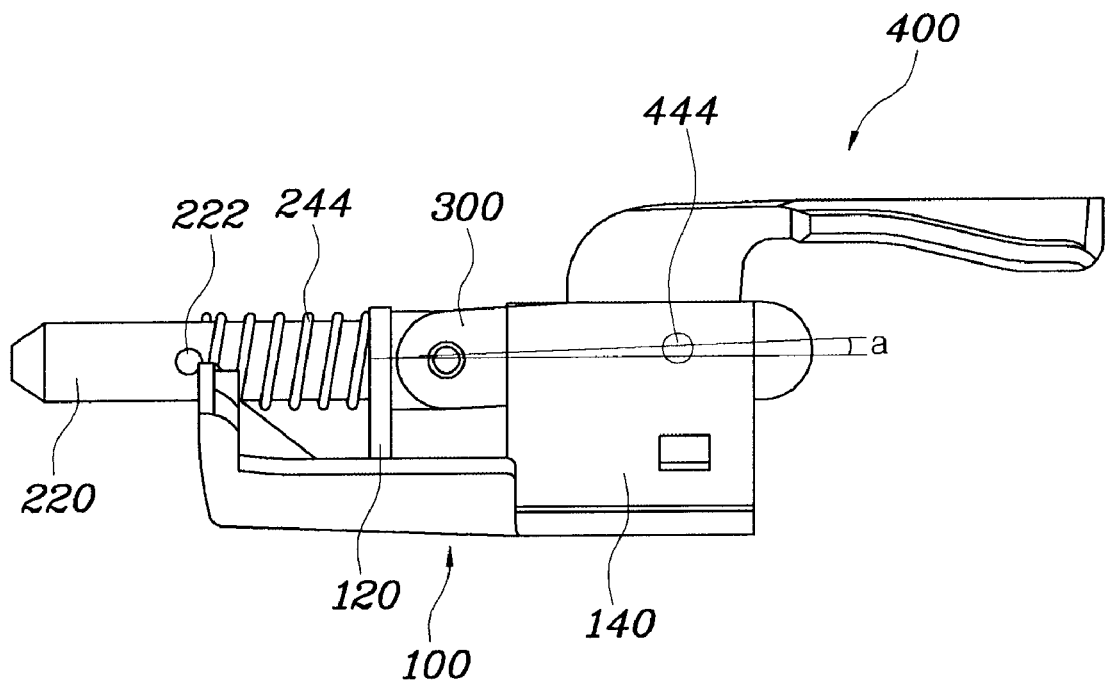
FIG. 9 is a side view of the first pin side of the cross bar shown in FIG. 3.
Figure 10A:
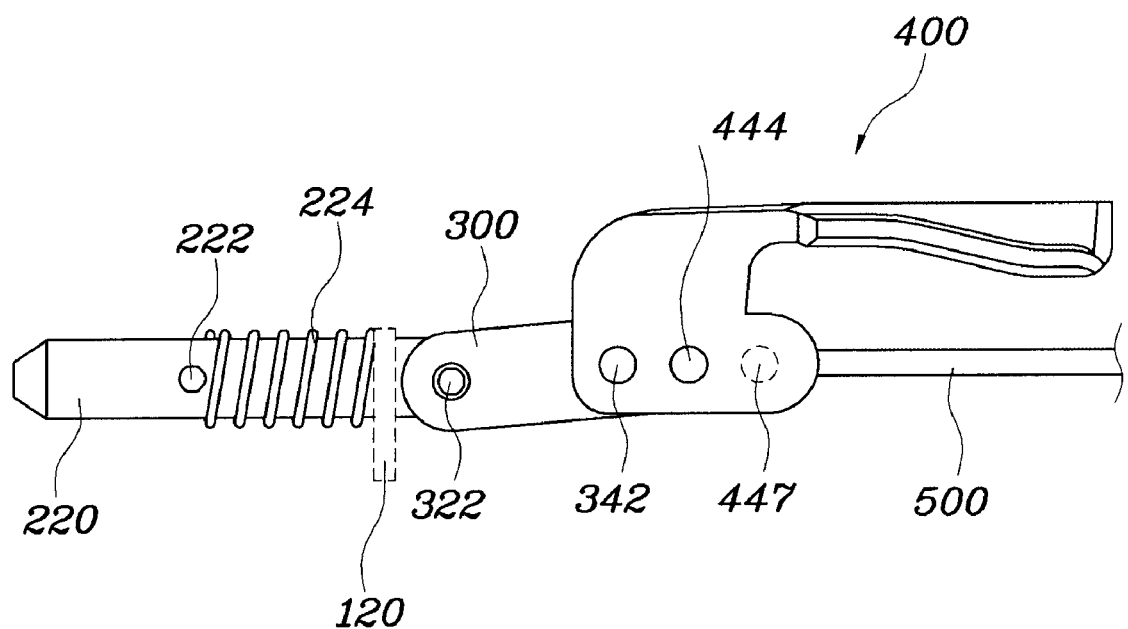
FIG. 10A is a schematic drawing corresponding to FIG. 9, in which the first bracket is omitted.
Figure 10B:
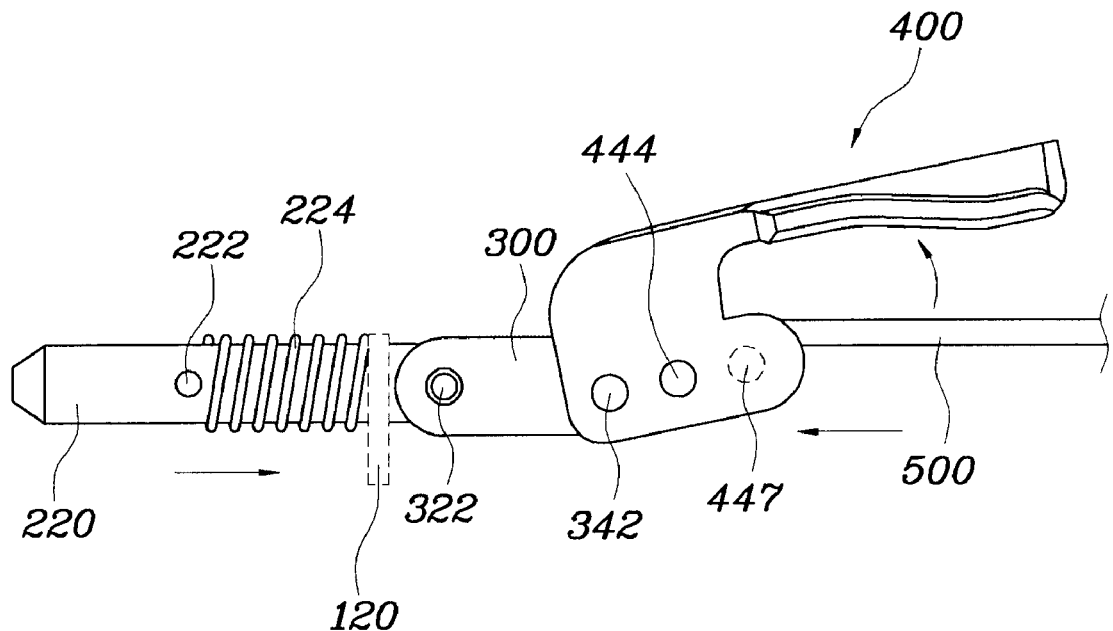
FIG. 10B is a view showing a state that the release lever is rotated slightly in a counterclockwise direction from the position of release lever in FIG. 10A.
Figure 10C:
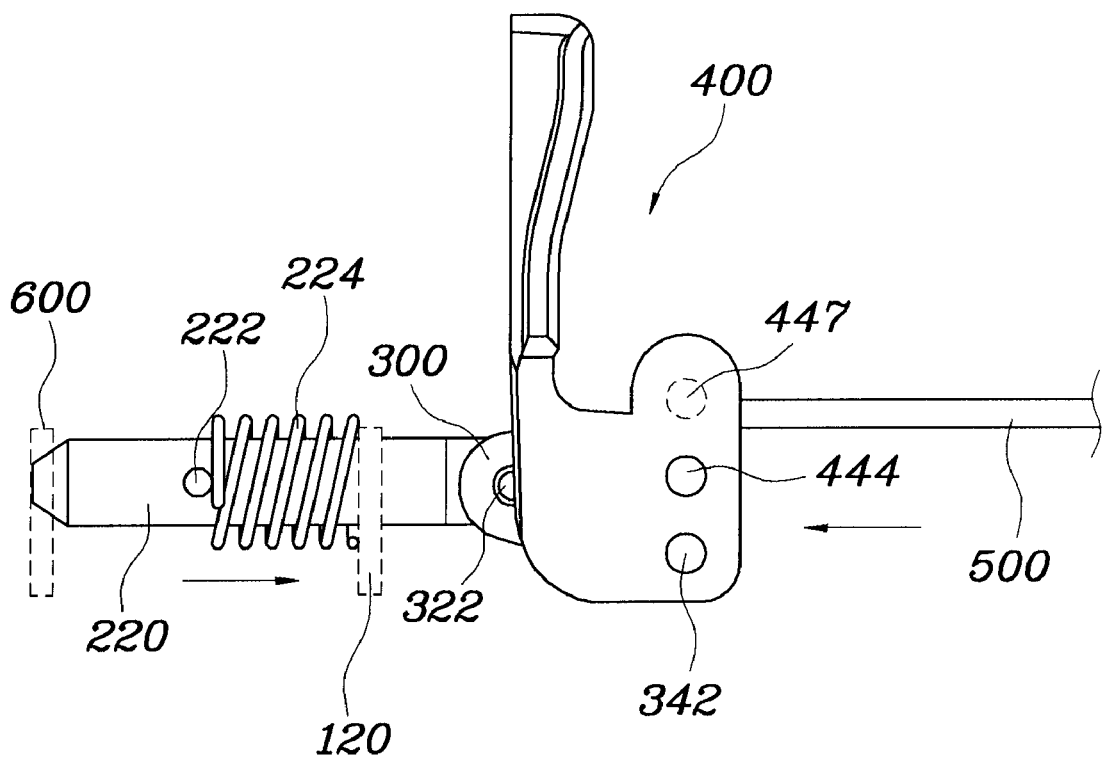
FIG. 10C is a view showing a state that the release lever is rotated about 90 degrees in a counterclockwise direction from the position of release lever in FIG. 10A.

Referring to FIGS. 9 to 10C, as the grip part 420 of the release lever 400 on the first bracket 100 is pulled, the release lever 400 is rotated counterclockwise. And the link 300 and the first locking pin 220 are operated in conjunction with the release lever 400, such that the first locking pin 220 overcomes the elastic force of the spring 224 and is retracted rearward. Meanwhile, the wire 500 is coupled to the connection point 447. As the coupling part 440 rotates counterclockwise, the wire 500 is pulled toward to the first locking pin 220 and the second locking pin 240 is retracted toward to the first locking pin 220. Thus, by manipulating one release lever 400, it is possible to retract both the first and second locking pins 220 and 240.

As shown in FIGS. 9 and 10A, when the first locking pin 220 is in its initial position and the grip part 420 is contacted with the cross bar body 800, the rear end portion 340 of the link 300 is slightly lifted and the link 300 makes a mutual angle of 'a' degree with the first locking pin 220. Preferably, the angle ranges from 5 to 10 degrees.

In the above situation, the first locking pin 220 can not be retracted even though a pushing force is applied to the first end of the locking pin 220. That is because the link 300 should rotate counterclockwise and the release lever 400 should rotate clockwise in order to retract the first locking pin 220 by pushing the first end of the first locking pin 220, however, the grip part 420 cannot rotate clockwise since the grip part 420 of the release lever 400 is located at the lowermost position contacted with the cross bar body 800. Thus, even though vibration or pressing force resulting from the shaking of a vehicle is transmitted to the first locking pin 220, the first locking pin 220 is not retracted before the grip part 420 is rotated counterclockwise.

As shown in FIG. 10B, when the release lever 400 is slightly rotated counterclockwise about the rotating shaft 444 by pulling the grip part 420 of the release lever 400, the rear end portion 340 of the link 300 hinged to the coupling part 440 by the pin 342 comes down and the first locking pin 220 is aligned with the link 300 in a straight line. During this process, the wire 50 may be pulled slightly toward to the first locking pin 220 and the first locking pin 220 may be retracted slightly.

As shown in FIG. 10C, as the release lever 400 is rotated further counterclockwise to 90 degrees from its initial position in FIG. 10A, definitely, the wire 50 is pulled toward to the first locking pin 220 and the first locking pin 220 is retracted.

Figure 1B:
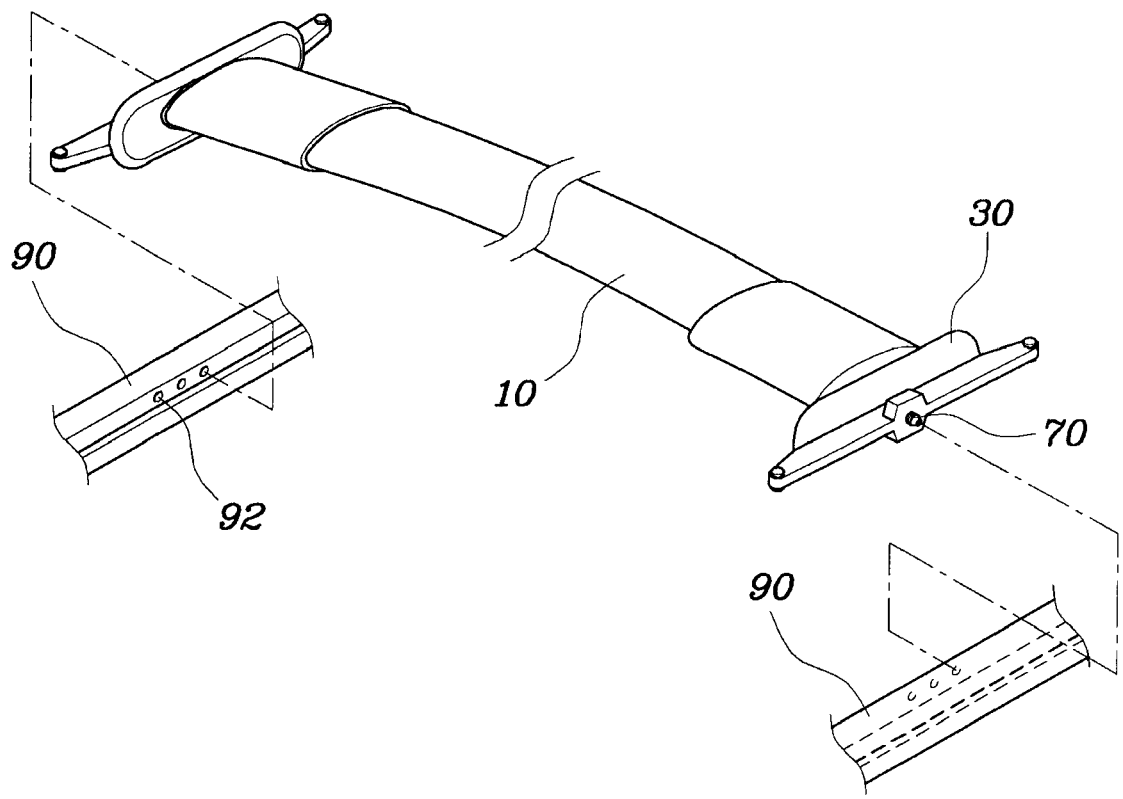
FIG. 1B is a drawing for explaining a position adjusting structure of the cross bar with respect to the side bars at the position indicated with A in FIG. 1A.

Preferably, the cross bar is configured such that the grip part 420 comes down to the state in FIG. 10B by elastic restoring forces of the springs 224 and 250 when a force pulling up the grip part 420 in FIG. 10C is removed. In the status shown in FIG. 10B, the first and second locking pins 220 and 240 may be locked in the pin insert holes 92 (refer to FIG. 1B), that is to say, first stage locking state of the cross bar to the side bar. When the grip part 420 is pressed from the state in FIG. 10B, the grip part 420 is firmly locked in the pin insert holes 92, that is to say, second stage locking state of the cross bar to the side bar. As such, the locking operation is performed in two stages, more reliably maintaining the locking state of the first and second locking pins 220 and 240

As described above, the present invention provides a cross bar of a roof carrier for vehicles, in which a release lever is mounted to only one side and only one wire is used, thus reducing manufacturing costs.

Further, the present invention provides a cross bar of a roof carrier for vehicles, in which a locking operation is performed in two stages, thus more reliably maintaining the locking state of a locking pin, and in which only one wire is used, thus increasing durability compared to a conventional cross bar using two wires.

For convenience in explanation and accurate definition in the appended claims, the terms "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A cross bar of a roof carrier for vehicles, comprising:
   a cross bar body placed transversely between side bars provided on both longitudinal sides of a roof;
   first and second brackets provided, respectively, on both distal ends of the cross bar body and slidably coupled to the side bars;
   first and second locking pins provided, respectively, on the first and second brackets, and elastically inserted into the corresponding side bars;
   a link positioned in the first bracket and hinged at a first end thereof to a first end of the first locking pin;
   a release lever including a coupling part, wherein one end of the coupling part is hinged to a second end of the link and coupled to the cross bar body via a rotating shaft, and a grip part extending from the coupling part to be exposed to an outside, so that when the release lever rotates around the rotating shaft, the link and the first locking pin are pulled into the cross bar body; and
   a wire passing through the cross bar body, and coupling the coupling part of the release lever with the second locking pin, so that the wire pulls the second locking pin into the cross bar body during rotation of the release lever to pull the first locking pin into the cross bar body;
   wherein a locking pin support part is provided on each of the first and second brackets, and a portion of an associated locking pin passes through the locking pin support part, and a locking protrusion is provided on a passing part of the locking pin, and an elastic member is interposed between the locking protrusion and the locking pin support part, so that the locking pin is elastically ejected into the corresponding side bar.

2. The cross bar of the roof carrier for vehicles as set forth in claim 1, wherein the first end of the first locking pin is aligned to be lower than the rotating shaft of the coupling part.

3. The cross bar of the roof carrier for vehicles as set forth in claim 1, wherein the coupling part of the release lever has on a center portion thereof the rotating shaft, and is coupled at a rear end thereof to the wire, and the grip part is integrated with the coupling part in such a way as to extend rearwards from an upper end of the coupling part, wherein the grip part is offset from the rotating shaft in a predetermined distance.

4. The cross bar of the roof carrier for vehicles as set forth in claim 3, wherein a movement axis of the first locking pin is aligned to be lower than the rotating shaft of the release lever.

5. The cross bar of the roof carrier for vehicles as set forth in claim 3, wherein the rear end of the coupling part coupled to the wire protrudes rearwards, so that when the coupling part rotates around the rotating shaft, a wire pulling amount is increased.

6. The cross bar of the roof carrier for vehicles as set forth in claim 1, wherein a lever locking part is provided on the cross bar body and the coupling part of the release lever is pivotally coupled to the lever locking part and the locking pin support part is provided on a central portion of the first bracket.

7. The cross bar of the roof carrier for vehicles as set forth in claim 6, wherein the coupling part of the release lever is installed to an inner surface of the lever locking part via the rotating shaft, and the link is hinged to an inner surface of the coupling part of the release lever, and the first locking pin is hinged to an inner surface of the first end of the link, thus preventing lateral movement.

8. The cross bar of the roof carrier for vehicles as set forth in claim 1, wherein a stopper protrudes from a part of each of the first and second locking pins connected to the link or wire, thus preventing each of the first and second locking pins from being removed from the locking pin support part.

9. The cross bar of the roof carrier for vehicles as set forth in claim 1, wherein, when the grip part of the release lever is pressed down and located at a lowermost end, a portion of the link coupled to the coupling part moves upwards and forms a predetermined angle with the first locking pin, thus preventing undesirable movement of the first locking pin.

* * * * *